United States Patent

[11] 3,601,992

| [72] | Inventor | Richard L. Maison |
| | | San Diego, Calif. |
| [21] | Appl. No. | 45,139 |
| [22] | Filed | June 10, 1970 |
| [45] | Patented | Aug. 31, 1970 |
| [73] | Assignee | Rohr Corporation |
| | | Chula Vista, Calif. |

[54] THRUST REVERSING APPARATUS
13 Claims, 4 Drawing Figs.

[52] U.S. Cl.................................................. 60/226,
60/230, 239/265.19, 239/265.29
[51] Int. Cl.............................................. F02k 3/02
[50] Field of Search........................................... 60/226,
225, 224, 230, 228; 239/265.19, 265.24, 265.29, 265.31

[56] References Cited
UNITED STATES PATENTS

| 2,847,823 | 8/1958 | Brewer........................... | 239/265.29 |
| 2,945,346 | 7/1960 | Arnzen........................... | 239/265.29 |
| 3,279,182 | 10/1966 | Helmintoller................. | 60/226 A |
| 3,344,604 | 10/1967 | Mattia............................ | 60/226 A |
| 3,475,913 | 11/1969 | Mortlock....................... | 60/226 X |

*Primary Examiner*—Clarence R. Gordon
*Attorney*—George E. Pearson

ABSTRACT: Fan jet engine has cowl surrounding engine and terminating in jet exhaust nozzle. Elongate streamlined shroud surrounds fan and engine to define annular duct for fan air terminating forward of exit end of nozzle. Main body of shroud terminates in transverse plane, and peripherally spaced support struts extend rearwardly to define peripherally spaced outflow passages for diverted fan air. Nozzle ring may be attached to aft ends of support struts to provide unit structure. Set of blocker doors overlie each other in each passage and are pivoted on transverse axes which are spaced fore and aft. All doors in a set are stowed and deployed in unison by an actuator. Aft ends of aft doors when deployed contact cowl and block rearward flow. When deployed, all doors diverge forward to produce cascade effect with forward air flow component. Forward doors do not contact shrouds, and aft end of each succeeding door is closer to the cowl to intercept and deflect different portions of air stream. Forward ends of doors are similarly stepped to deliver reverse thrust air at different radial distances outward of the shroud.

PATENTED AUG 31 1971 3,601,992

INVENTOR.
RICHARD L. MAISON
BY
George E. Pearson
ATTORNEY

THRUST REVERSING APPARATUS

BACKGROUND OF THE INVENTION

This invention lies in the field of gas turbine engines, commonly called jet engines, which produce reaction thrust by ejecting a high velocity stream of gas from the exhaust nozzle of the gas turbine, and is directed to thrust reversing apparatus for the front fan type of jet engine in which a nacelle or shroud surrounds the engine and is spaced outwardly from the core engine cowl to define an annular passage or duct for flow of air rearwardly from the outer portion of an enlarged axial flow compressor. In this type of engine, a large proportion of the total thrust is developed by the reaction to the air driven rearward by the fan and the balance results from ejection of the exhaust gas stream from the turbine.

As is the case with all jet type engines, the airplanes which are equipped with them have high landing speeds which place a heavy burden on the wheel brakes. To reduce this burden, most such airplanes are provided with means to reverse the direction of flow of the jet stream during landing runs to produce a reverse thrust. Many different types of thrust reversers have been developed and used for this purpose. All of them utilize a basic principle of blocking rearward flow of the jet stream and diverting it laterally and forwardly. One type uses blocker doors swung directly behind the jet nozzle and diverging forwardly. Another type uses openings in the sidewalls of the nozzle or a surrounding shroud together with blocker doors which swing toward the engine axis to block rearward flow and extend outward to direct the diverted flow laterally and forwardly. Still another type utilizes cascade sets in the sidewalls of the jet or shroud with various means to block rearward flow and uncover the cascades. All of these have various merits and have been used successfully. Their principal problems have been cost, weight, and complexity with resultant high maintenance expense.

SUMMARY OF THE INVENTION

The present invention obtains the benefits mentioned above while providing an apparatus which adds very little weight or complexity, with relatively few machined parts, thus reducing initial cost. Generally stated, the apparatus includes an elongate shroud which surrounds the fan and engine and provides an annular duct for the rearward flow of fan air, the duct terminating forward of the exit end of the exhaust gas nozzle. The main body of the shroud terminates in a transverse plane, and a plurality of support struts extend generally axially rearward from the main body and are spaced peripherally to define between them a plurality of passages for the outflow of jet stream air during the reversing operation. A nozzle ring may be provided at the aft ends of the support struts and fixedly attached to combine all of the struts into a reinforced unit structure.

Each passage is provided with a plurality of blocker doors which may be only two but preferably includes three or more doors. Each door in a set is supported on pivotal mountings having a transverse axis, and preferably the axes parallel to the axis of the engine. The axes are spaced fore and aft from each other, and each pivotal mounting is at a locus intermediate the fore and aft ends of the respective door. In the preferred form shown, the foremost door is the shortest and each succeeding door is longer both fore and aft of its respective pivotal mounting.

In stowed position, the foremost door lies in the forward part of the passage and defines part of the contour of the inner wall of the shroud. The forward part of the next succeeding door overlies part of the foremost door and its aft part defines another portion of the inner wall of the shroud. Any other intermediate doors would be arranged in the same way. The aft door overlies all of the forward doors and its outer wall defines all of the contour of the outer wall of the shroud throughout the length of the respective passage. At the same time the aft portion of the inner wall of the aft door defines the remainder of the contour of the inner wall of the cowl.

The doors are connected to each other by linkage so that they all move in unison, and the foremost door is connected to an actuator to stow and deploy all of the doors in one set. In deployed position all doors diverge forward and produce a cascade effect to impart a forward flow component to the exiting air. The aft door is the longest both fore and aft of its pivotal mounting and its aft end is the only one which swings in far enough to contact the engine cowl. The aft doors of all sets combine to block rearward flow. Each shorter door intercepts and deflects a different portion of the fan air. The forward ends of the doors are similarly stepped in deployed position to deliver the reverse thrust air at different radial distances outward of the shroud.

BRIEF DESCRIPTION OF THE DRAWINGS

Various other advantages and features of novelty will become apparent as the description proceeds in conjunction with the accompanying drawings, wherein.

DESCRIPTION OF PREFERRED EMBODIMENT

Figure 1:
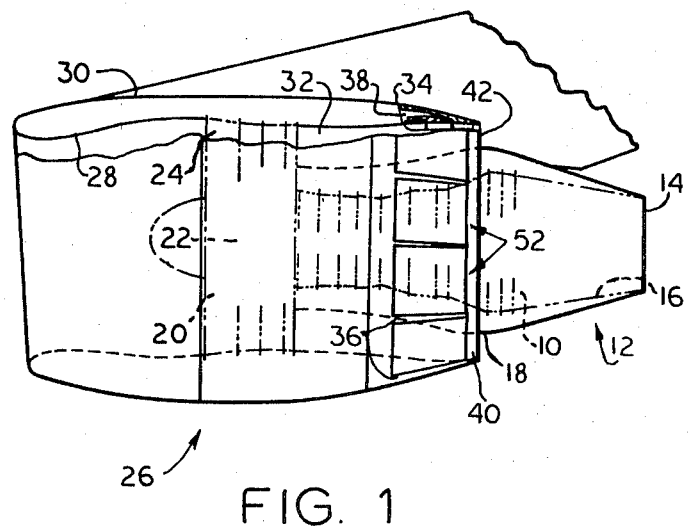
FIG. 1 is a schematic side view of an engine installation partly in section.

The apparatus of this invention is generally schematically illustrated in FIG. 1, in which the engine 10 is encased within a core cowl 12 which terminates rearwardly at the exit 14 of the exhaust gas nozzle or tail pipe 16, the greatest diameter of the cowl being at an intermediate locus 18. At its forward end, the engine is provided with an axial flow compressor or fan 20, the radially inner portion 22 of which directs combustion air into cowl 12 and the radially outer portion 24 of which drives a jet or fan air stream rearward outside of the cowl to directly produce jet thrust. Surrounding the fan and engine is an elongate generally annular shroud 26 having radially spaced inner and outer walls 28 and 30. The inner wall 28 is radially spaced from cowl 12 to form an annular duct 32 for rearward flow of the fan air stream. The main body of the shroud terminates rearwardly at a transverse plane 34, and a plurality of support struts 36 extend generally axially rearward from the main body and are arranged in peripherally spaced relation to define between them a plurality of peripherally spaced fan air outlet passages 38. In some installations a nozzle ring 40 is provided which is secured to the aft ends of the struts to combine them into a unit structure and also to provide a thin trailing edge 42 in a transverse plane substantially at locus 18.

Figure 3:
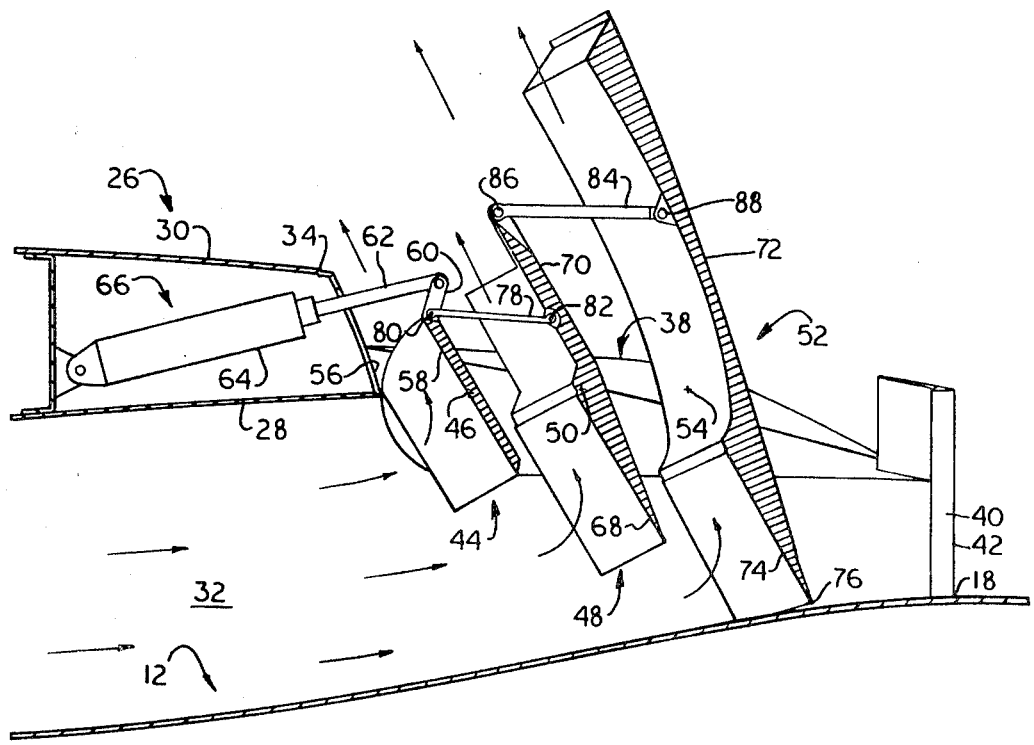
FIG. 3 is a view similar to FIG. 2 with the blocker doors in deployed position.

In the presently preferred form, the blocking and reversing mechanism includes a plurality of sets of blocking doors located in each of the passages 38, each set comprising a minimum of two and preferably three or more doors. It has been found that eight of such sets of doors provides a very satisfactory arrangement, with three doors in each set as illustrated. These doors are best shown in FIG. 3 in their stowed position, with door 44 being connected to the adjacent struts by pivotal mountings 46 on a transverse axis, door 48 being similarly pivotally mounted at 50, and door 52 being similarly pivotally mounted at 54. The pivotal axes are parallel to each other, axially spaced, and lie generally in a common plane which is parallel to the longitudinal axis of the engine and shroud. The inner and outer walls of the shroud are connected by member 56 which forms the forward wall of each passage 38 and diverges forwardly to guide the exiting air stream during reversing operation.

The foremost door 44 occupies the forward end of passage 38 with its forward end 58 adjacent to the inner end of wall 56, and the door is laterally curved to define a portion of the contour of the inner wall 28 of the shroud. A control horn 60 is fixedly attached to end 58 and pivotally connected to piston rod 62 which may be extended and retracted within cylinder 64 of actuator 66 to swing the door between stowed and deployed positions.

Intermediate door 48 has an aft portion 68 which likewise defines a portion of the contour of inner wall 28 of the shroud and a forward portion 70 which may outwardly overlie all or the rearward portion of door 44. Aft door 52 is much longer than the other doors and its outer wall 72 fills the entire area of passage 38 and also defines a portion of the contour of the outer wall 30 of the shroud. Door 52 outwardly overlies all of the other doors and is radially spaced from them. The aft portion 74 of the inner wall of door 52 defines the remainder of the contour of the inner wall 28 of the shroud, and its trailing edge 76 underlies part of nozzle ring 40.

Figure 2:
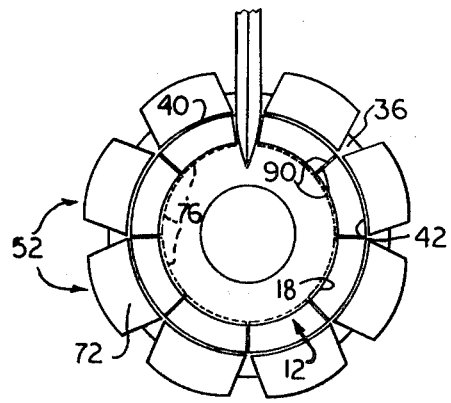
FIG. 2 is a rear view of the engine installation of FIG. 1 with the doors deployed.

Linkage mechanism is provided to cause all of the doors in a set to swing in unison between the stowed position of FIG. 2 and the deployed position of FIG. 3 in response to operation of actuator 66. A force transmitting link 78 is pivotally connected at 80 to the forward end 58 of door 44 and is pivotally connected at 82 to a point on door 48 forward of its pivotal mounting 50. A second force transmitting link 84 is pivotally connected at 86 to the forward end of door 48 and is pivotally connected at 88 to a point on door 52 forward of its pivotal mounting 54. Thus, when door 44 is directly swung by the actuator, links 78 and 84 force the other doors to swing to approximately the same extent. The relative angular movement may be varied for particular design considerations by changing the lengths of the links or the locations of the pivotal connections.

Figure 4:
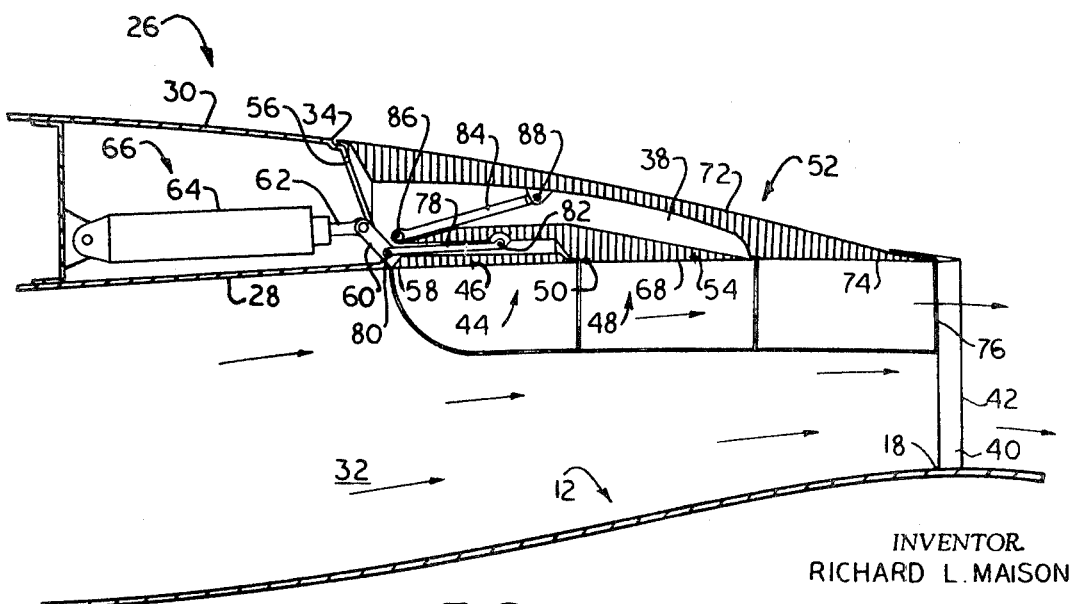
FIG. 4 is a schematic sectional view of a portion of the aft end of the shroud with the blocker doors in stowed position.

In the deployed position of FIG. 3, it will be seen that all of the doors diverge forwardly at about the same angle as wall 56 of passage 38 and produce a cascade effect, which eliminates the need for building in a separate cascade unit and movable doors to open and close it. The trailing edge 76 of door 52 is the only one which contacts cowl 12 to block rearward flow. The side edges 90 of the doors 52 around the perimeter, FIG. 4, are shaped to move in closely spaced relation with respect to each other to provide complete blockage of rearward flow so that all of the fan air must issue outward and forward through passages 38. The aft portion of each door in the set is successively shorter so that each door will intercept and deflect a different portion of the fan air. The same is true of the forward portions so that each door will deliver its share of the air at successively greater distances outward of the shroud. The curvature of the doors provides a trough effect to reduce spillage. In addition, if desired, the side edges of the doors may be fenced to further reduce spillage.

The relative sizes of the doors in a set are shown schematically in FIG. 3. The dimensions may be varied for different designs but in general the aft door is longest and each succeeding door is shorter whether the total is less or more than three. If desired, by a slight design change, the foremost door may be modified so that its leading end will extend beyond the outer contour line of the shroud when deployed. A separate actuator is normally provided for each set of doors and they may be synchronized in various known ways. The actuator load is rather small because the loads on doors 48 and 52 are partially balanced in deployed position. The clockwise torque on that portion of these doors within the fan air duct is reacted against by the clockwise torque on that effective portion within the free stream.

While the illustrative embodiment of the invention is described as mounted on an engine with forward fan it obviously would operate satisfactorily with any fan jet engine with the fan mounted forwardly of the doors. Advantageous features of the apparatus of the the invention include the fact that no door components are translated, all such movement being about pivotal mountings, and there is a minimum of machined parts in the assembly, which reduces initial as well as maintenance costs.

Having thus described the invention, what is claimed as new and useful and desired to be secured by U.S. Letters Patent is:

1. Thrust reversing apparatus for use in combination with a jet engine enclosed in a core cowl and having a compressor fan extending radially beyond the cowl, comprising: a streamlined shroud surrounding the engine and fan and having inner and outer walls spaced from each other throughout at least the major portion of the length of the shroud; the inner wall being radially spaced from the engine cowl to define therewith a generally annular duct for rearward flow of the propulsion air stream delivered by the fan; the shroud terminating forward of the trailing edge of the engine cowl; and a plurality of sets of blocker doors located at the aft end of the shroud; each set including at least two blocker doors each pivotally mounted about a transverse axis with the axes spaced fore and aft; the sets being arranged in spaced relation around the periphery of the shroud; the aft door in each set defining a portion of the contour of the outer wall of the cowl and being swingable to a deployed position diverging forward with its inner end contacting the engine cowl and with its side edges in substantially sealing relation with the adjacent aft doors to block rearward flow of the propulsion air stream and divert it outwardly and forwardly; the door pivoted forwardly of the aft door in each set lying generally parallel to the aft door in stowed position and swinging in unison with the aft door to a deployed position generally parallel to the aft door and with its inner end spaced from the engine cowl; the doors in each set forming a cascade arrangement in deployed position to divide the air stream and to divert all of it laterally outward with a forward component to produce a reverse thrust.

2. Apparatus as claimed in claim 1; the outer ends of the aft door and the door forward thereof in each set extending outward beyond the normal contour of the shroud when in deployed position.

3. Apparatus as claimed in claim 2; the outer end of the aft door in each set extending outward a substantial distance beyond the outer end of the door forward thereof when the doors are in deployed position.

4. Apparatus as claimed in claim 1; each set comprising at least three doors mounted with their axes spaced fore and aft to increase the cascade effect.

5. Apparatus as claimed in claim 1; an actuator connected to one of the doors in each set to swing it between stowed and deployed positions; the doors in the set being interconnected by linkage means to cause them to move in unison in response to operation of the actuator.

6. Apparatus as claimed in claim 1; including at least three doors in each set; the transverse pivotal mounting of each door being located intermediate the fore and aft ends of the door; a force transmitting link pivotally connected to the leading end of the foremost door and to a locus on the succeeding door forward of the pivotal mounting of the succeeding door; similar linkage connections between all succeeding doors; and an actuator connected to the foremost door to cause all of the doors in the set to move in unison between stowed and deployed positions.

7. Apparatus as claimed in claim 1; the shroud comprising a main body which is substantially peripherally continuous and which terminates in a transverse plane forward of the sets of doors, and a plurality of support struts extending rearward from the main body and peripherally spaced to define a plurality of outflow passages for the propulsion air stream; one of said sets of doors being located in each of said passages and the doors being pivotally mounted on the support struts.

8. Apparatus as claimed in claim 7; and a nozzle ring connected to the aft ends of all of the support struts to produce a reinforced unit structure.

9. Apparatus as claimed in claim 7; at least one door in each set in stowed position defining a portion of the contour of the inner wall of the shroud in the forward end of its respective passage; the aft portion of the inner wall of the aft door defining the remainder of the contour of the inner wall of the shroud in its respective passage.

10. Apparatus as claimed in claim 9; the outer wall of the aft door defining the contour of the outer wall of the shroud throughout the length of its respective passage.

11. Apparatus as claimed in claim 7; including at least three doors in each set, the transverse pivotal mounting of each door being located intermediate the fore and aft ends of the door; the foremost door occupying the forward portion of the passage and defining in stowed position a portion of the contour of the inner wall of the shroud; at least one intermediate door having a forward portion outwardly overlying at least part of the foremost door and an aft portion defining a portion of the contour of the inner wall of the shroud when in stowed position; the aft door in stowed position outwardly overlying the remainder of the doors in the set.

12. Apparatus as claimed in claim 11; each succeeding door in the set from fore to aft having a greater axial extent aft of its respective pivotal mounting to intercept and deflect separate portions of the rearwardly flowing propulsion air stream.

13. Apparatus as claimed in claim 11; each succeeding door in the set from fore to aft having a greater axial extent forward of its respective pivotal mounting to deliver its respective portion of the deflected air stream at successively greater radial distances outward of the shroud.